(12) United States Patent
Edwards

(10) Patent No.: US 7,826,189 B1
(45) Date of Patent: Nov. 2, 2010

(54) BATTERY SWELL TRIGGERED OVERRIDE SYSTEM

(75) Inventor: Chris Edwards, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 12/043,293

(22) Filed: Mar. 6, 2008

(51) Int. Cl.
*H02H 3/00* (2006.01)
*H01M 2/00* (2006.01)
*H02J 7/00* (2006.01)

(52) U.S. Cl. ............... 361/86; 429/61; 320/132; 320/135

(58) Field of Classification Search .......... 361/86; 429/61; 320/132, 135
See application file for complete search history.

(56) References Cited

U.S. PATENT DOCUMENTS 6,531,847 B1 * 3/2003 Tsukamoto et al. ......... 320/135

FOREIGN PATENT DOCUMENTS

WO 2006/118386 A1 11/2006

\* cited by examiner

*Primary Examiner*—Jared Fureman
*Assistant Examiner*—Lucy Thomas

(57) ABSTRACT

A battery dimensional change detection system and associated methods provide battery "swell" detection capabilities for an electronic device. In this way, excessive dimensional changes that are detected lead to shutting off the power supplied by the battery. According to one aspect, a battery dimensional change detection system broadly includes a testing circuit, a voltage detection device, and a shut-off switch. The testing circuit is formed by one or more electrically conductive members and extends across an exposed portion of the battery, such that the circuit possesses first and second terminal ends. The voltage detection devices engages the first and second terminal ends to measure the voltage across the testing circuit. Selectively responsive to the particular voltage measurement value, the shut-off switch may prevent further battery discharge in the electronic device, thereby acting to inhibit further battery dimensional change.

10 Claims, 2 Drawing Sheets

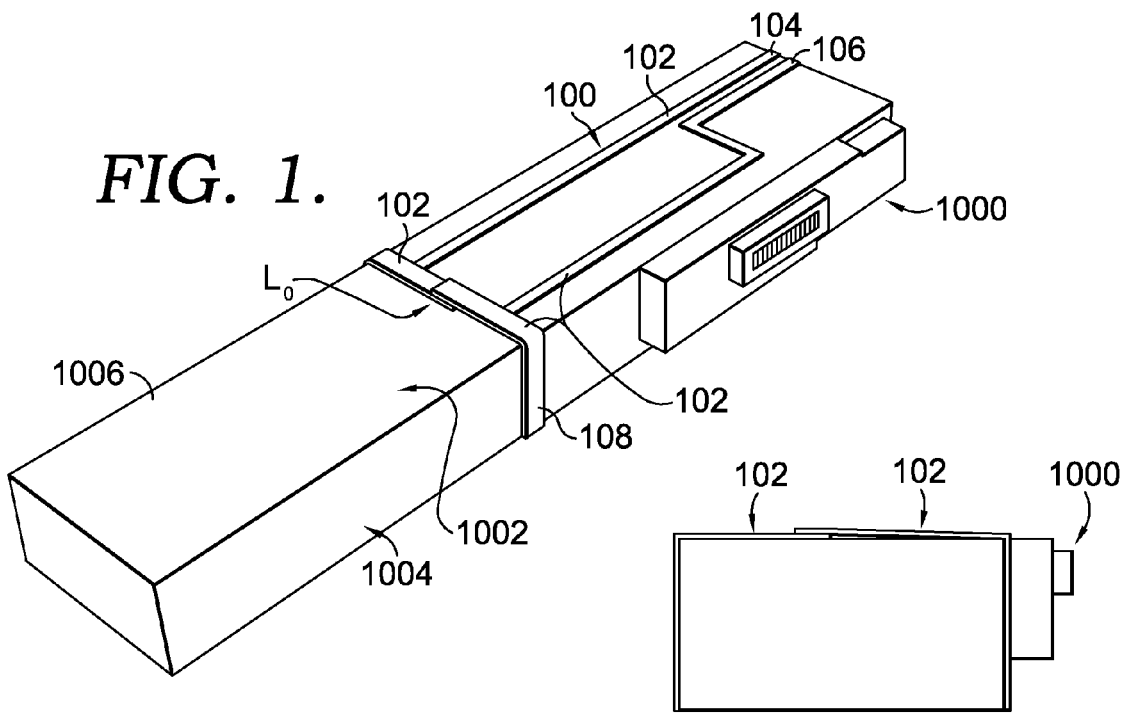
FIG. 1.
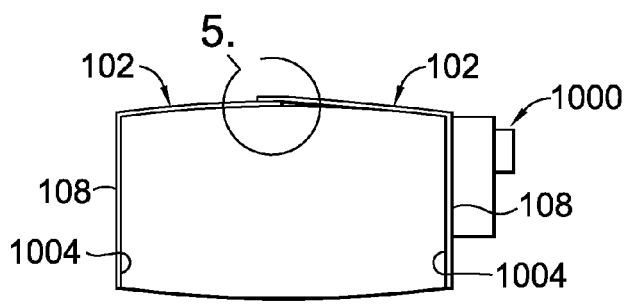
FIG. 3.
FIG. 4.
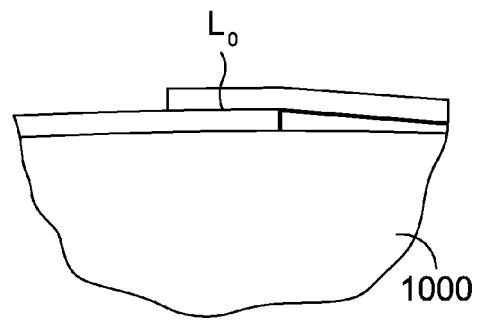
FIG. 5.
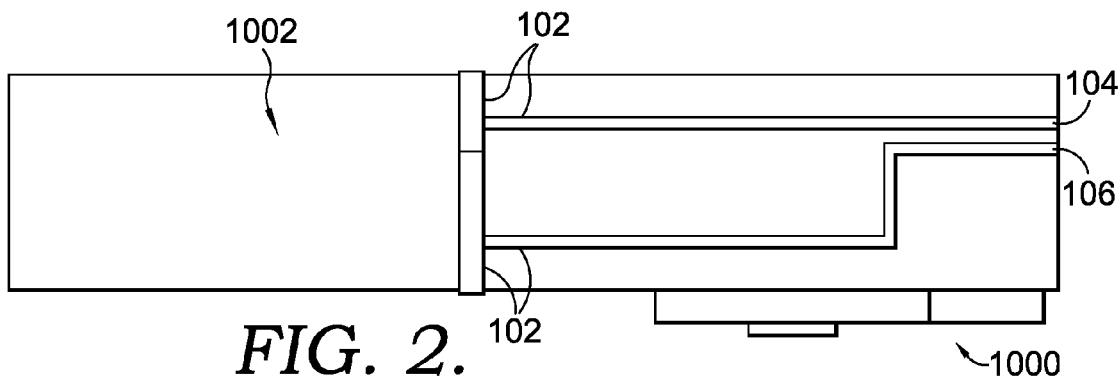
FIG. 2.

BATTERY SWELL TRIGGERED OVERRIDE SYSTEM

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods are provided for detecting the "swell" or dimensional change of a battery operable within an electronic device, and in response, shutting off the power supplied by the battery. According to one aspect, a battery dimensional change detection system broadly includes a testing circuit, a voltage detection device, and a shut-off switch. The testing circuit is formed by one or more electrically conductive members and extends across an exposed portion of the battery, such that the circuit possesses first and second terminal ends. The voltage detection devices engages the first and second terminal ends to measure the voltage across the testing circuit. Selectively responsive to the particular voltage measurement value, the shut-off switch may prevent further battery discharge in the electronic device, thereby acting to inhibit further battery dimensional change.

A method is provided in a further aspect for shutting off discharge of a battery operably housed within an electronic device. According to the method, a voltage is measured across a testing circuit coupled with the battery via first and second terminal ends of the testing circuit. Based on the particular voltage measurement value, the battery may be selectively disconnected from a power circuit of the electronic device. In one arrangement, the battery is disconnected in circumstances where the currently measured voltage value exceeds a predetermined voltage value. In another arrangement, disconnection of the battery occurs in circumstances where the currently measured voltage value exceeds a previously measured voltage value by a predetermined value.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein:

FIG. 1 is a perspective view of an electronic device battery configured with a testing circuit, in accordance with an embodiment of the present invention;

FIG. 2 is a top plan view of the electronic device battery and testing circuit of FIG. 1;

FIG. 3 is a front elevational view of the electronic device battery and testing circuit of FIG. 1 showing the battery prior to a swelling event;

FIG. 4 is a front elevational view of the electronic device battery and testing circuit of FIG. 1 showing the battery undergoing a swelling event;

FIG. 5 is a close-up view of the area generally identified by circled area of FIG. 4, showing the conductive members of the testing circuit.

DETAILED DESCRIPTION

Figure 6:
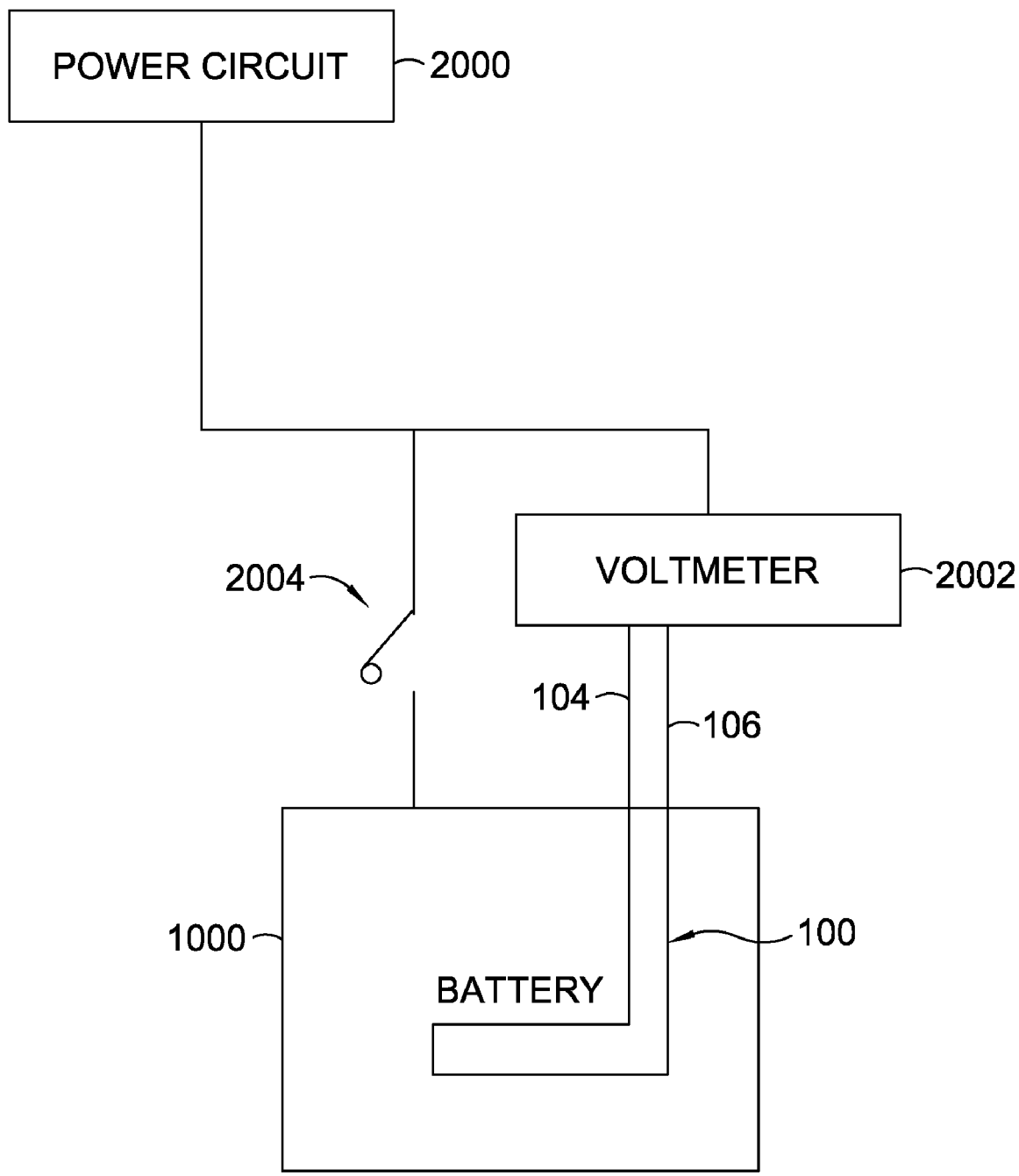
FIG. 6 is a schematic view of a battery dimensional change detection system employing the testing circuit.

Embodiments of the present invention provide a solution for mitigating battery "swell" by a dimensional change detection system coupled with the battery. For instance, a discharging battery may encounter an internal gaseous buildup due to exothermic chemical reactions between battery components. The electrical conductivity (and by analogy, resistivity) properties of the testing circuit are measured during battery discharge in powering an electronic device. Due to the configuration of the testing circuit, the electrical properties of the circuit are necessarily altered by dimensional changes of the battery during discharge, specifically "swelling" of the battery. Electrical current is passed through one or more electrically conductive members that form the testing circuit, the conductive members being, in one embodiment, disposed on the outer surface of the battery. It should be understood that the term "conductive members" is meant to include those members made of material classified as conductive (e.g., copper or other metals) or semi-conductive (e.g., silicon-based).

In one arrangement, changes in the measured resistivity across the testing circuit are noted. In conjunction with other known factors that may affect resistivity of the circuit (e.g., change in temperature of the conductive members during electronic device operation), the change in resistivity may be correlated with a change in both the cross-sectional dimension and the length of the testing circuit, indicating that a "swelling" battery is applying a force on the circuit. For instance, in the exemplary arrangement shown in FIGS. 1-5, the "swelling" battery moves each of a pair of conductive members of the testing circuit upward and outward, so that the degree of overlap of the conductive members (shown in FIG. 5) necessary to complete the conductive pathway for the testing circuit, and thus the cross-sectional area of the testing circuit, is reduced while the length of the circuit slightly increases. The reduction in cross-sectional area at the location of conductive member overlap (referred to herein as the "overlap location") and increase in circuit length increases the resistivity of the circuit so long as the overlap location represents the smallest cross-sectional area along the testing circuit. In another arrangement explained in further detain herein, the testing circuit does not rely on multiple conductive members having an overlap location, but merely relies on the change in cross-section of the testing circuit (and thus the change in electrical properties of the circuit, such as resistivity) resulting from the swelling battery applying a force on the circuit to create an elongation stress. In any case, the change in resistivity of the testing circuit may be measured by a variety of means, such as through a voltage measurement. Accordingly, the electrical properties of the circuit, such as its voltage, may be measured during operation of the battery in the electronic device. Such measured electrical properties may then either be compared to a baseline predetermined value without battery swell, or simply measured a number of times during battery operation, to detect the electrical property differences across the testing circuit. Based on such measurements, a sufficient change in electrical properties (e.g., a voltage rise) compared to the base value or to previously measured values signals that battery swelling is sufficient enough that operation of the battery within the electronic device should cease to protect the battery and the electronic device within which the battery is operating.

With continued reference to FIGS. 1-5, one embodiment of an exemplary electronic device battery 1000 and testing circuit 100 are depicted. The electronic device battery 1000 is designed to provide electrical power for any type of electronic device, such as a laptop computer, portable telephone, or any other type of device. The testing circuit 100 is formed by one or more electrically conductive and/or semi-conductive members 102 and possesses a first terminal end 104 and a second terminal end 106. In the exemplary arrangement shown, a pair of conductive members 102 forms the testing circuit 100, with the members 102 disposed on and extending across an outwardly exposed portion 1002 of the battery 1000. The member 102 interface with one another at an overlap location $L_O$ to create a cross-sectional area critical point for the testing circuit 100, as explained in further detain here. The first and second terminal ends 104 and 106 of the testing circuit 100 may be positioned proximal to a perimeter of the battery 1000 to facilitate the measurement of the electrical properties of the testing circuit 100 during battery operation (discharge).

In one arrangement, the testing circuit 100 may be coupled with the battery 1000 via flanged anchor portions 108 adhered to or otherwise attached with opposed sidewalls 1004 of the battery 1000. In an alternative arrangement, the testing circuit 100 may be formed into an exterior cover 1006 of the battery 1000 with the first and second terminal ends 104 and 106 remaining exposed. In yet another arrangement, the testing circuit 100 may be formed or mounted into a receptacle of an electronic device (not shown) where the battery 1000 is housed, such that upon normal battery installation, the testing circuit 100 abuts the exposed portion 1002 of the battery 1000. In any case, the testing circuit 100 should be electrically insulated from the surrounding environment and physically interface with the battery 1000 when installed in the respective electronic device to the extent necessary to be affected by dimensional changes of the battery 1000. For instance, in the arrangement where the testing circuit is attached with or formed into the exterior cover 1006 of the battery 1000, portions of the battery contacting the testing circuit should be formed of non-conductive materials.

As referenced above, the electrical properties of the testing circuit 100 are measured to determine if dimensional changes of the battery are occurring during operation in the respective electronic device. In one schematic arrangement illustrated in FIG. 6, the voltage across the testing circuit 100 is measured during battery operation at the first and second terminal ends 104 and 106. The measured voltage value is directly correlated to the electrical resistivity of the testing circuit 100, which changes as the most narrow cross-sectional area portion of the testing circuit 100 changes in dimension and where the length of the testing circuit 100 slightly increases. Specifically, upon swelling of the battery 1000 (depicted in FIGS. 4 and 5) the cross-sectional area of the testing circuit 100 (e.g., at the overlap location $L_O$) is reduced, causing an increase in the resistivity of the testing circuit 100 through the conductive member(s) 102. By accounting for other factors that affect the resistivity of the testing circuit 100, such as operating temperature, the measured voltage value for the testing circuit 100 can be correlated with a certain degree of battery 1000 swell affecting the circuit 100 cross-sectional area and overall length dimensions. Preestablished voltage value limits (or changes in measured voltage values) may then act as a trigger to indicate excessive battery 1000 swell. Continued operation of the battery 1000 may then be terminated by a cut-off switch to avoid continued battery 1000 swelling that may result in damage to the battery and/or the electronic device in which the battery 1000 is operating. It should also be understood that the first and second terminal ends 104 and 106 of the testing circuit 100 may represent the physical ends of the testing circuit 100 (conductive members 102) or merely distal locations along the testing circuit 100 where it is convenient to measure electrical properties of the circuit 100 on either side of the overlap location $L_O$.

Accordingly, in one operational scheme, a small electrical current is supplied by a power circuit 2000 of the electronic device to the testing circuit 100 when the battery is in normal operational (discharge) mode. A voltmeter 2002 measures the voltage across the testing circuit 100 via engagement with the first and second terminal ends 104 and 106. When the measured voltage exceeds a certain predetermined threshold value, or increases sufficiently in value compared to a previously measured value, the voltmeter 2002 triggers a shut-off switch 2004 to disconnect the battery 1000 from the power circuit 2000 of the electronic device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated to be within the scope of the claims. Additionally, it is intended that references to components of the present invention in the singular encompasses one or more of such components.

What is claimed is:

1. A battery dimensional change detection system for a battery, wherein the battery has an exposed portion, and wherein the battery is operatively housed in an electronic device that receives electrical power from the battery, the system comprising:
   a testing circuit formed by at least one electrically conductive member, wherein the testing circuit interfaces with the battery such that a dimensional change of the battery alters a cross-sectional area of the testing circuit, wherein the testing circuit includes a first terminal end and a second terminal end;
   a voltage detection device configured for measuring the voltage across the testing circuit by engaging the first terminal end and the second terminal end of the testing circuit; and
   a shut-off switch selectively responsive to a particular voltage measurement value by the voltage detection device to prevent further battery discharge in the electronic device.

2. The system of claim 1, wherein the testing circuit extends across the exposed portion of the battery.

3. The system of claim 2, wherein the testing circuit includes anchor portions for coupling with the battery.

4. The system of claim 1, wherein the testing circuit is formed by a pair of electrically conductive members overlapping one another, wherein one of the pair of electrically conductive members possesses the first terminal end of the testing circuit and the other one of the pair of electrically conductive members possesses the second terminal end of the testing circuit.

5. The system of claim 1, wherein the shut-off switch is configured to prevent further battery discharge in the electronic device when the particular voltage measurement value exceeds a predetermined value.

6. The system of claim 1, wherein the shut-off switch is configured to prevent further battery discharge in the electronic device when the particular voltage measurement value exceeds a previous voltage measurement by a predetermined value.

7. A method for shutting off the discharge of a battery in an electronic device, wherein the battery has an exposed portion and is operatively housed within the electronic device, and wherein a testing circuit interfaces with the battery, wherein the testing circuit includes a first terminal end, a second terminal end, and a portion that has a variable electrical resistance, the method comprising:
    measuring the voltage across the testing circuit via the first terminal end and the second terminal end of the testing circuit, wherein the voltage is correlated with a change in an electrical resistance of the testing circuit; and
    disconnecting the battery from a power circuit of the electronic device upon determining that:
        a) the voltage exceeds a predetermined voltage value, or
        b) the voltage exceeds a previously measured voltage value by a predetermined value.

8. The method of claim 7, wherein the testing circuit extends across the exposed portion of the battery.

9. The method of claim 7, wherein the testing circuit is formed by at least one electrically conductive member.

10. The method of claim 8, wherein the testing circuit is formed by a pair of electrically conductive members overlapping one another, wherein one of the pair of electrically conductive members possesses the first terminal end of the testing circuit and the other one of the pair of electrically conductive members possesses the second terminal end of the testing circuit.

* * * * *